(12) United States Patent
Yi et al.

(10) Patent No.: US 7,859,585 B2
(45) Date of Patent: Dec. 28, 2010

(54) PORTABLE TERMINAL HAVING CAMERA LENS ASSEMBLY

(75) Inventors: Young-Jin Yi, Yongin-si (KR); Duk-Won Jung, Suwon-si (KR); Han-Kil Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1185 days.

(21) Appl. No.: 11/433,800

(22) Filed: May 12, 2006

(65) Prior Publication Data
US 2006/0268142 A1    Nov. 30, 2006

(30) Foreign Application Priority Data
May 30, 2005    (KR)    ............. 10-2005-0045642

(51) Int. Cl.
*H04N 5/222* (2006.01)
*H04M 1/00* (2006.01)

(52) U.S. Cl. .................... 348/333.06; 455/575.3

(58) Field of Classification Search ............ 348/333.06, 348/333.01
See application file for complete search history.

(56) References Cited

U.S. PATENT DOCUMENTS

| | | | | |
|---|---|---|---|---|
| 6,011,699 | A * | 1/2000 | Murray et al. | 361/814 |
| 6,396,924 | B1 * | 5/2002 | Suso et al. | 379/433.13 |
| 6,879,337 | B2 * | 4/2005 | Tatehana et al. | 348/14.02 |
| 6,882,726 | B2 * | 4/2005 | Kim | 379/433.13 |
| 6,977,648 | B1 * | 12/2005 | Wang et al. | 345/211 |
| 7,369,175 | B2 * | 5/2008 | Kim | 348/373 |
| 7,382,412 | B2 * | 6/2008 | Ahn et al. | 348/373 |
| 7,388,616 | B2 * | 6/2008 | Yamazaki | 348/373 |
| 7,477,736 | B2 * | 1/2009 | Ibaraki et al. | 379/433.13 |
| 7,532,459 | B2 * | 5/2009 | Son et al. | 361/679.56 |
| 2002/0177464 | A1 * | 11/2002 | Swerup et al. | 455/550 |
| 2004/0012701 | A1 * | 1/2004 | Nagai et al. | 348/333.12 |
| 2004/0056977 | A1 * | 3/2004 | Kim | 348/376 |
| 2004/0063476 | A1 * | 4/2004 | Katagishi et al. | 455/575.7 |
| 2004/0107537 | A1 * | 6/2004 | Ahn et al. | 16/221 |
| 2004/0233321 | A1 * | 11/2004 | Jung et al. | 348/362 |
| 2004/0233625 | A1 * | 11/2004 | Saitou et al. | 361/683 |

(Continued)

FOREIGN PATENT DOCUMENTS

CN    1404284    3/2003

(Continued)

*Primary Examiner*—Lin Ye
*Assistant Examiner*—Amy Hsu
(74) *Attorney, Agent, or Firm*—The Farrell Law Firm, LLP

(57) ABSTRACT

A portable terminal is disclosed, having a first housing, a second housing that is rotatably combined with the first housing and moves toward or away from the first housing while facing the first housing, and a camera lens assembly provided on the second housing. The second housing moves toward or far from the first housing as it is rotated with respect to a predetermined hinge axis. The hinge axis provides a rotation axis of a lens housing of the camera lens assembly, the rotation axis extending in a longitudinal direction of the camera lens assembly and passing through the center of the camera lens assembly. The lens housing and the second housing rotate with respect to the first housing as the second housing is moved toward or away from the first housing and the lens housing are rotated with respect to the second housing by a user when desired.

6 Claims, 3 Drawing Sheets

U.S. PATENT DOCUMENTS

| | | | |
|---|---|---|---|
| 2005/0094025 A1* | 5/2005 | Yoon | 348/360 |
| 2005/0140812 A1* | 6/2005 | Yoo et al. | 348/333.06 |
| 2005/0272462 A1* | 12/2005 | Okamoto | 455/550.1 |
| 2006/0033832 A1* | 2/2006 | Shin | 348/335 |
| 2006/0091268 A1* | 5/2006 | Lee | 248/187.1 |

FOREIGN PATENT DOCUMENTS

| | | |
|---|---|---|
| KR | 10-2005-0020208 | 3/2005 |
| KR | 10-2005-0037055 | 4/2005 |

\* cited by examiner

PORTABLE TERMINAL HAVING CAMERA LENS ASSEMBLY

PRIORITY

This application claims priority under 35 U.S.C. §119 to an application entitled "Portable Terminal Having Camera Lens Assembly" filed in the Korean Intellectual Property Office on May 30, 2005 and assigned Serial No. 2005-45642, the contents of which are incorporated herein by reference.

BACKGROUND OF THE INVENTION

1. Field of the Invention

The present invention generally relates to a portable terminal, and in particular, to a terminal structure for improving antenna radiation characteristics of a portable terminal having a housing made of a metal material.

2. Description of the Related Art

Generally, "portable terminal" refers to an electronic device that a user can carry to perform wireless communication with a desired partner. Various services such as voice call service, a short message service, a mobile banking service, television, on-line game service and video on-demand (VOD) service are provided to users of portable terminals.

The portable terminals may be classified into bar-type terminals, flip-type terminals and folder-type terminals based on their appearance. The bar-type terminal has a single housing in which input/output devices such as a communication circuit, a transmitting unit and a receiving unit are mounted. The flip-type terminal has a flip that is mounted to the bar-type terminal. The folder-type terminal is opened and closed by rotation of a pair of housings in which input/output devices are arranged. Sliding-type terminals have recently emerged, and improve portability and convenience in use. Sliding-type and folder-type terminals tend to aesthetically satisfy users.

The diversification of mobile communication services and designs of terminals for aesthetically satisfying users requires various functions of portable terminals beyond simple communication functions. For example, mounting of a camera lens assembly for photographing and video telephony in a portable terminal has become commonplace and most recently mass-produced portable terminals generally have a camera lens assembly mounted thereon.

The portable terminals that once were small and lightweight have become larger again as the sizes of display devices increase for sufficiently large screen sizes with the development of multimedia services.

A camera lens assembly of a portable terminal causes a change in the design of the portable terminal and may restrict the design of the portable terminal because the camera lens assembly is exposed to the exterior of the terminal.

Furthermore, as the mounting of camera lens assemblies in portable terminals becomes increasingly commonplace, and users' interests with respect to features become more diverse, special attention is placed on restriction in designs of the portable terminals. As a result, decoration of the exterior of a portable terminal using a camera lens assembly and a variety of designs of the portable terminal using various rotation movements of the camera lens assembly are desired.

SUMMARY OF THE INVENTION

It is, therefore, an object of the present invention to provide a portable terminal having a camera lens assembly that has a variable exterior design and with which a plurality of rotation movements of the portable terminal can result.

To achieve the above and other objects, there is provided a portable terminal having a first housing, a second housing that is rotatably combined with the first housing and is movable toward or away from the first housing while facing the first housing, and a camera lens assembly provided on the second housing. The second housing is movable toward or away from the first housing as it rotates with respect to a predetermined hinge axis. The hinge axis provides a rotation axis of a lens housing of the camera lens assembly, the rotation axis being extended in the longitudinal direction of the camera lens assembly and passing through the center of the camera lens assembly. The lens housing and the second housing rotate with respect to the first housing as the second housing is moved toward or away from the first housing and the lens housing are rotated with respect to the second housing by a user when desired.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for the sake of clarity.

Figure 1:
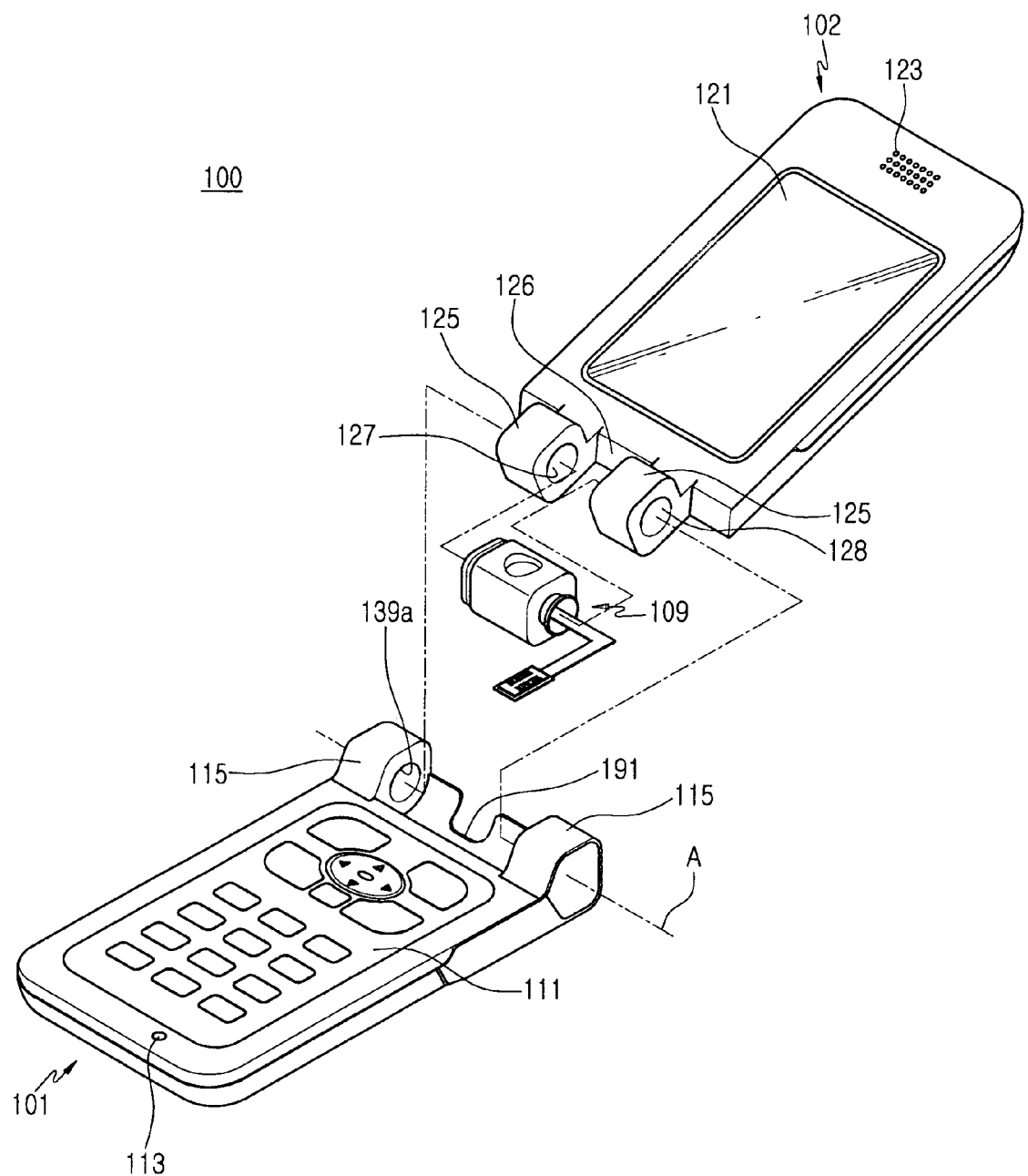
FIG. 1 is an exploded perspective view of a portable terminal having a camera lens assembly according to a preferred embodiment of the present invention.

Referring to FIG. 1, a portable terminal 100 having a camera lens assembly 109 according to a preferred embodiment of the present invention is a folder-type terminal including a first housing 101 and a second housing 102 rotatably combined with the first housing 101. The camera lens assembly 109 is mounted on the second housing 102 and can be rotated, together with the second hosing 102, with respect to the first housing 101. The camera lens assembly 109 may also be rotated with respect to the second housing 102 when desired.

A keypad 111 including a plurality of keys and a transmitting unit 113 having a microphone embedded therein are mounted in a face of the first housing 101. A pair of side hinge arms 115 is formed separate from each other on an upper portion of the first housing 101 and protrudes from the face of the first housing 101.

The second housing 102 includes a display device 121 and a receiving unit 123 having a speakerphone embedded therein opposite the first housing 101. A center hinge arm 125 is formed at one end of the second housing 102 and is rotatably combined between the side hinge arms 115. Thus, as the second housing 102 moves from its folded position opposite the first housing 101, the keypad 111, the transmitting unit 113, the display device 121 and the receiving unit 123 are opened. An opening 126 is formed on the center hinge arm 125 to provide a space in which the camera lens assembly 109 is combined. To secure a photographing path for the camera lens assembly 109, another opening 191 is formed between the side hinge arms 115 on the first housing 101.

Although not shown in FIG. 1, the portable terminal 100 may include a hinge device to combine the second housing 102 with the first housing 101. The configuration and operation of the hinge device are disclosed in Korean Patent No. 6,292,980 granted on Sep. 25, 2001, which is commonly assigned to the assignee of the present invention. In the disclosed hinge device, a hinge housing accommodates a hinge cam and a hinge axis, in each of which a protrusion portion and a recess portion are formed, and an elastic force is exerted in a particular direction and the protrusion portion of the hinge cam is attached to the recess portion of the hinge axis using an elastic means. The elastic force of the elastic means is transformed into driving force that rotates the hinge axis by a cam curve diagram of the protrusion portions and the recess portions.

Figure 2:
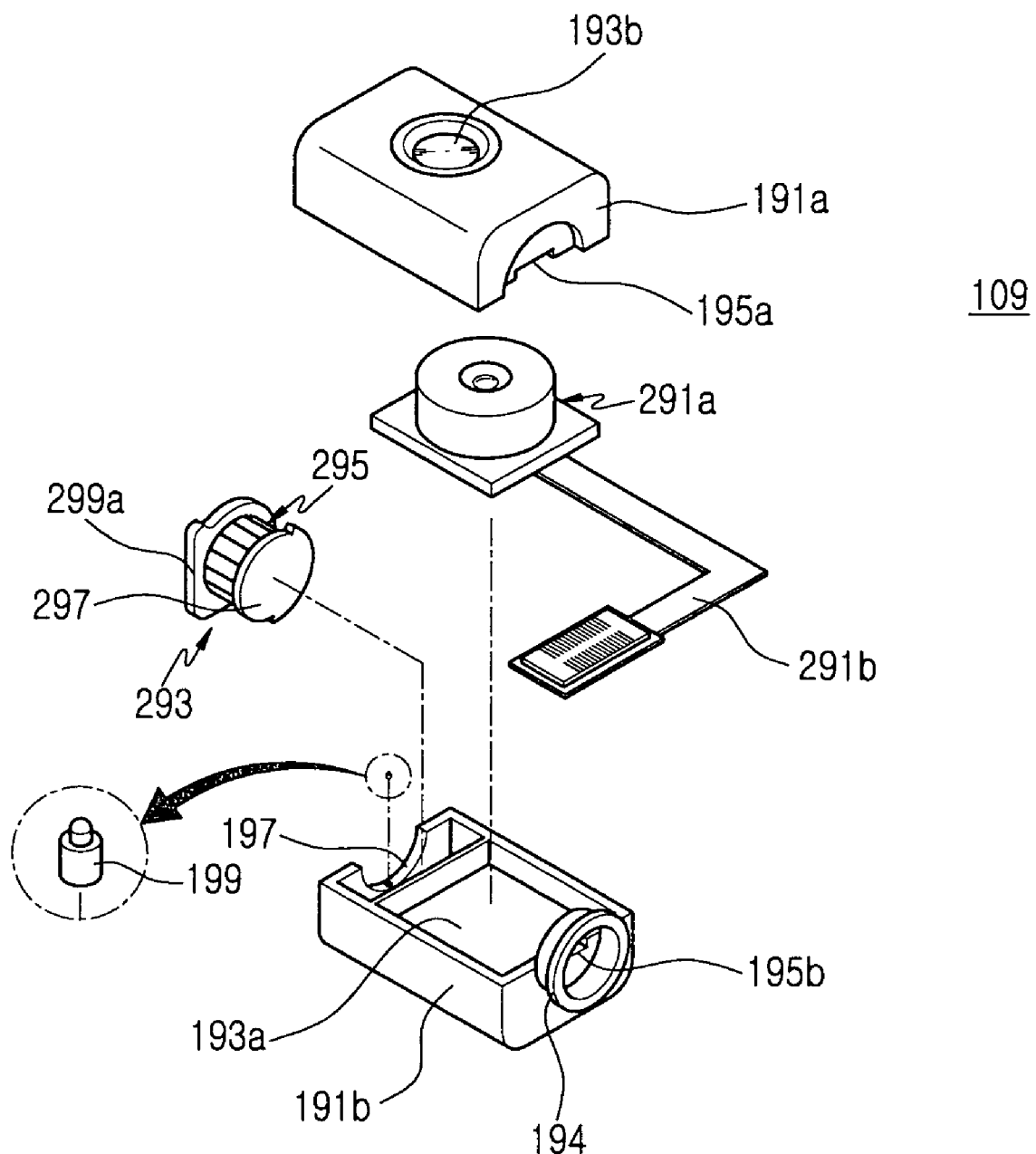
FIG. 2 is an exploded perspective view of a camera lens assembly of the portable terminal shown in FIG. 1.

Referring to FIG. 2, the camera lens assembly 109 includes lens housings 191a and 191b having a camera device 291a embedded therein and a camera dummy 293 for rotatably combining the lens housing 191a and 191b on the second housing 102.

The lens housing 191a and 191b includes the front housing 191a in which an exposure window 193b is formed and the rear housing 191b combined with the front housing 191a. A resting groove 193a is provided in the rear housing 191b to position the camera device 291a. When the front housing 191a and the rear housing 191b are combined, a rotation groove 197 is formed at one end of each of the lens housings 191a and 191b and guide holes 195a and 195b are formed at the other ends of the lens housing 191a and 191b. A circular guide rib 194 protrudes from the other end of the rear housing 191b to surround the guide holes 195a and 195b. At least one pair of pogo pins 199 is installed at equiangular intervals along the inner circumference of the rotation groove 197. The pogo pins 199 are mechanical components having compression springs embedded therein such that one end of the pogo pin 199 is pushed out by elastic force of the compression spring.

The rotation groove 197 of the lens housing 191a and 191b provides a space in which the camera dummy 293 is rotatably combined and the guide holes 195a and 195b provide a path along which a flexible printed circuit 291b extends from the camera device 291a and can be extended to the outside of the lens housing 191a and 191b. The guide rib 194 provides a means for rotatably combining the other ends of the lens housing 191a and 191b on the second housing 102.

The camera dummy 293 includes a combination plate 299a, a serration shaft 295 and a support plate 297. The combination plate 299a provides a means fixed on the center hinge arm 125. The serration shaft 295 is extended from a face of the combination plate 299a and is rotatably combined to the rotation groove 197 of the lens housing 191a and 191b. A plurality of grooves and protrusions are alternatively formed at equiangular intervals along the outer circumference of the serration shaft 295. Thus, when the serration shaft 295 is combined to the rotation groove 197, one end of the pogo pin 199 is selectively engaged with at least one of the grooves formed on the outer circumference of the serration shaft 295. The support plate 297 is supported in the inner walls of the lens housing 191a and 191b, thereby preventing the camera dummy 293 from being separated from the lens housing 191a and 191b.

Figure 3:
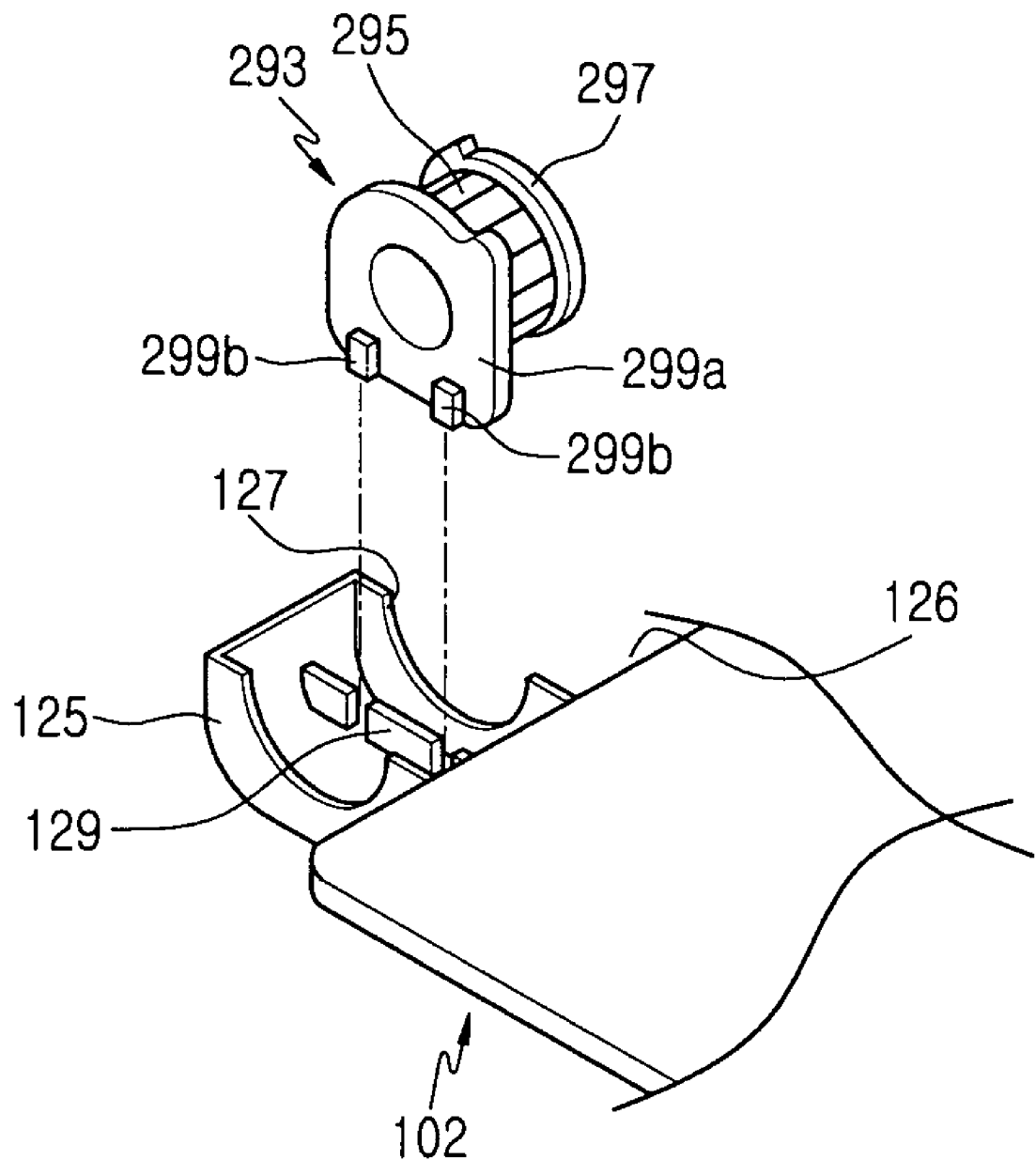
FIG. 3 is an exploded perspective view showing a camera dummy assembled in the portable terminal shown in FIG. 1.

Referring to FIG. 3, the camera dummy 293 is fixed in the center hinge arm 125 at one end of the opening 126. A support rib 129 is formed in the center hinge arm 125 and a pair of support protrusions 299b is formed at the other end of the combination plate 299a. The support rib 129 is engaged between the support protrusions 299b, thereby being attached to the other end of the combination plate 299a. At the same time, one end of the combination plate 299a is attached to the inner wall of the center hinge arm 125. Thus, the combination plate 299a is fixed to the second housing 102, and more specifically, the center hinge arm 125.

A via hole 127 is formed in the wall of one end of the opening 126 in the center hinge arm 125 to provide a path along which the serration shaft 295 moves when the combination plate 299a is fixed to the center hinge arm 125.

One end of the respective lens housings 191a and 191b is rotatably combined to one end of the opening 126 formed on the center hinge arm 125 through the camera dummy 293 and the other end of the respective lens housing 191a and 191b is rotatably combined to the other end of the opening 126 through the guide rib 194.

As mentioned above, the center hinge arm 125 is rotatably combined between the side hinge arms 115 formed on the first housing 101. Therefore, as the center hinge arm 125 is combined between the side hinge arms 115, a hinge axis A that is the center of rotation of the second housing 102 is provided.

The hinge axis A extends in the longitudinal direction of the lens housing 191a and 191b and passes through the centers of the camera dummy 293, the lens housing 191a and 191b and the guide rib 194. Thus, the hinge axis A not only provides the center of rotation of the second housing 102 but also the center of rotation of the lens housing 191a and 191b.

In the camera lens assembly 109, as the second housing 102 rotates with respect to the first housing 101, the lens housing 191a and 191b also rotate. This is because the lens housing 191a and 191b are subject to rotation of the second housing 102 by the operations of a serration structure of the camera dummy 293 and the pogo pins 199. The serration structure of the camera dummy 293 and the pogo pins 199 restrict movement of the camera lens assembly 109, thereby providing stability in photographing.

The lens housing 191a and 191b can be rotated by a user when desired. When the user rotates the lens housing 191a and 191b, one end of the respective at least one pair of pogo pins 199 is pushed out and sequentially engaged with the grooves formed on the outer circumference of the serration shaft 295, and thus a clicking noise and feel is generated.

As described above, the lens housing 191a and 191b are combined on the second housing 102 using the camera dummy 293 according to the present invention and rotation or movement of the lens housing 191a and 191b with respect to the second housing 102 is restricted using the serration structure and the pogo pins 199 formed in the camera dummy 293. Thus, the lens housing 191a and 191b also rotate when the second housing 102 rotates with respect to the first housing 101, and the lens housing 191a and 191b can be rotated by a user when desired. Therefore, the design and operation of the camera lens assembly 109 such as rotation of the lens housing 191a and 191b can be varied, a clicking noise and feel is provided by the serration structure and the pogo pins 199 when the lens housing 191a and 191b rotate with respect to the second housing 102, and stable photographing can be performed by restricting the movement of the lens housing 191a and 191b.

While the invention has been shown and described with reference to a certain preferred embodiment thereof, it will be understood by those skilled in the art that various changes in form and details may be made therein without departing from the spirit and scope of the invention.

What is claimed is:

1. A portable terminal comprising:
a first housing;

a second housing that is rotatably combined with the first housing and is movable toward or away from the first housing while facing the first housing;

a camera dummy fixed on the second housing; and a camera lens assembly provided on the second housing, the camera lens assembly being provided with a lens housing having a first end rotatably connected to the camera dummy, a second end, a guide rib provided on the second end of the lens housing, and rotatably connected to the second housing, a serration structure that includes a plurality of grooves and protrusions formed at equiangular intervals along an outer circumference of the camera dummy, and pogo pins selectively engaged with the grooves of the serration structure, wherein the second housing is movable toward or away from the first housing as it is rotated with respect to a predetermined hinge axis, the hinge axis provides a rotation axis of the lens housing, the rotation axis extending in a longitudinal direction of the camera lens assembly and passing through a center of the camera lens assembly, the lens housing and the second housing rotate with respect to the first housing as the second housing is moved toward or away from the first housing, and a clicking noise and feel is provided as the pogo pins are selectively engaged with the grooves of the serration structure while the lens housing is rotated with respect to the second housing.

2. The portable terminal of claim 1, further comprising:

a center hinge arm provided at one end of the second housing and rotatably combined with the first housing; and an opening formed on the center hinge arm to provide a space for accommodating the lens housing, wherein the camera dummy is fixed to a wall of an end of the opening and the guide rib is rotatably combined to a wall of a second end of the opening.

3. The portable terminal of claim 2, wherein the camera dummy comprises:

a combination plate fixed in the center hinge arm; and a serration shaft extending from a face of the combination plate and protruding from the opening, wherein a plurality of grooves and protrusions are formed at equiangular intervals along an outer circumference of the serration shaft.

4. The portable terminal of claim 1, wherein the lens housing includes a front housing having an exposure window and a rear housing and a rotation groove is formed at the first end or the second end of the lens housing such that the camera dummy is rotatably combined to the rotation groove in a state where the front housing and the rear housing are combined.

5. The portable terminal of claim 4, wherein the pogo pins include at least one pair of pogo pins installed at equiangular intervals along an inner circumference of the rotation groove.

6. The portable terminal of claim 1, wherein the lens housing comprises:

a camera device provided in the lens housing; and a flexible printed circuit surrounded by the guide rib and extending outside of the lens housing from the camera device.

* * * * *